US008137523B2

(12) United States Patent
Cho et al.

(10) Patent No.: US 8,137,523 B2
(45) Date of Patent: Mar. 20, 2012

(54) APPARATUS FOR AND METHOD OF SEPARATING POLARIZABLE ANALYTE USING DIELECTROPHORESIS

(75) Inventors: Yoon-kyoung Cho, Yongin-si (KR); Su-hyeon Kim, Yongin-si (KR); Chin-sung Park, Yongin-si (KR); Kyu-sang Lee, Yongin-si (KR); Jeong-gun Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 561 days.

(21) Appl. No.: 11/754,523

(22) Filed: May 29, 2007

(65) Prior Publication Data

US 2007/0284254 A1 Dec. 13, 2007

(30) Foreign Application Priority Data

May 29, 2006 (KR) ........................ 10-2006-0048301

(51) Int. Cl.
*G01N 27/26* (2006.01)
*G01N 27/447* (2006.01)

(52) U.S. Cl. ......... 204/547; 204/450; 204/600; 204/643

(58) Field of Classification Search .......... 204/450–461, 204/547, 601, 627, 638, 639, 643, 600; 205/775, 205/778, 782.5
See application file for complete search history.

(56) References Cited

U.S. PATENT DOCUMENTS 6,017,455 A * 1/2000 Shimoda et al. ......... 210/500.23
6,254,754 B1 * 7/2001 Ross et al. .................... 204/548
7,014,747 B2 3/2006 Cummings et al.
2003/0094369 A1 * 5/2003 Tolley et al. .................. 204/450
2004/0026250 A1 * 2/2004 Cummings et al. ........... 204/547
2004/0262159 A1 * 12/2004 Martin et al. ................. 204/450
2005/0148064 A1 * 7/2005 Yamakawa et al. ........ 435/287.2
2006/0234379 A1 * 10/2006 Lim et al. ...................... 435/378

OTHER PUBLICATIONS

Metz et al, Flexible Microchannels with Integrated Nanoporous Membranes for Filtration and Separation of Molecules and Particles, Micro Electro Mechanical Systems, 2002, 81-84, IEEE International Conference.*

Kang et al. (J. Micromech. Microeng. 14 (2004) 1249-1257).*

Chou, et al.; "Electrodeless Dielectrophoresis for Micro Total Analysis Systems"; IEEE Eng. Med. Biol. Mag.; vol. 22, No. 6; pp. 62-67; Fig. 3; Nov./Dec. 2003.

Korean Office Action dated May 4, 2007 for Application No. 10-2006-004301.

* cited by examiner

*Primary Examiner* — Jeffrey T Barton
*Assistant Examiner* — Jennifer Dieterle
(74) *Attorney, Agent, or Firm* — Cantor Colburn LLP

(57) ABSTRACT

An apparatus separating a polarizable analyte using dielectrophoresis includes a vessel including a membrane having a plurality of nano- to micro-sized pores, the membrane disposed inside the vessel, electrodes generating spatially non-uniform electric fields in the nano- to micro-sized pores of the membrane when an AC voltage is applied to the electrodes, and a power source applying the AC voltage to the electrodes, wherein a sectional area of the pores varies along a depth of the pores. A method of separating a polarizable material uses the apparatus.

4 Claims, 15 Drawing Sheets

APPARATUS FOR AND METHOD OF SEPARATING POLARIZABLE ANALYTE USING DIELECTROPHORESIS

This application claims priority to Korean Patent Application No. 10-2006-0048301, filed on May 29, 2006, and all the benefits accruing therefrom under U.S.C. §119, the contents of which in its entirety are herein incorporated by reference.

BACKGROUND OF THE INVENTION

1. Field of the Invention

The present invention relates to an apparatus for separating a polarizable analyte from a sample using dielectrophoresis and a method of using the same. More particularly, the present invention relates to an apparatus having an improved membrane and a method of using the apparatus.

2. Description of the Related Art

Particles, which can be dielectrically polarized in a non-uniform electric field, are subjected to a dielectrophoretic ("DEP") force when the particles have different effective polarizability from a surrounding medium, even if the dielectrically polarizable particles do not have electric charges. The motion of particles is determined by the dielectric properties, e.g., conductivity and permittivity, and not by the electric charges of the particles, which is well known in electrophoresis.

The DEP force applied to a particle is as follows:

$$F_{DEP} = 2\pi a^3 \varepsilon_m \mathrm{Re}\left(\frac{\varepsilon_p - \varepsilon_m}{\varepsilon_p + 2\varepsilon_m}\right)\nabla E^2 \quad (1)$$

where $F_{DEP}$ is a DEP force applied to the particle, a is the diameter of the particle, $\in_m$ is permittivity of a medium around the particle, $\in_p$ is permittivity of the particle, Re is a real part, E is an electric field, and $\nabla$ is a del vector operation. As shown in Equation 1, the DEP force is proportional to the volume of the particle, the difference between the permittivity of the medium and the permittivity of the particle, and the gradient of the square of the electric field intensity.

The direction of the DEP force is given by the Clausius-Mossofti ("CM") factor:

$$\text{CM factor}=Re[\in p^*-\in m^*]/(\in p^*+2\in m^*) \quad (2)$$

where $\in^*$ is a complex permittivity and is given by $\in^*=-i(\sigma/\omega)$, where $\sigma$ is conductivity and $\omega=2\pi f$. When the CM factor is greater than 0, the DEP force is positive and the particle is attracted to a high electric field gradient region. When the CM factor is less than 0, the DEP force is negative and the particle is attracted to a low electric field gradient region.

As shown in Equations 1 and 2, the DEP force applied to the particle depends on the conductivity of the medium and the frequency and intensity of an AC voltage.

Meanwhile, devices for separating polarizable analytes via DEP have been developed. For example, U.S. Pat. No. 7,014,747 discloses an apparatus for dielectrophoretic separation, including a fluid flow channel disposed on a substrate, wherein the fluid flow channel is provided with fluid inlet and outlet means in fluid communication with the fluid flow channel, and wherein the fluid flow channel has a plurality of insulating structures disposed therein; electrodes in electric communication with each of the fluid inlet and outlet means, wherein the electrodes are positioned to generate a spatially non-uniform electric field across the plurality of insulating structures, and wherein the spatially non-uniform electric field exerts a dielectrophoretic force on a sample undergoing separation; and power supply means connected to the electrodes to generate an electric field within the fluid flow channel, wherein an electroosmotic flow of a fluid in the fluid flow channel is not suppressed. Using the apparatus, a spatially non-uniform electric field is created due to an insulation structure, but the insulation structure interrupts the flow of the fluid, thereby generating clogging. Also, it is difficult to actually separate a sample since a target material is only separated spatially in the vicinity of an array of the plurality of insulation structures. Accordingly, the use of the apparatus is limited to enriching the target material or detecting an enriched target material, and is not suitable for separating the target material. In addition, the apparatus cannot be used when the flow rate is high or when the amount of a sample is large.

BRIEF SUMMARY OF THE INVENTION

To solve the problems in the prior art, an apparatus for separating a polarizable analyte using dielectrophoresis, which can increase the generation of asymmetric electric fields without interrupting the flow of a fluid, is provided. By using a membrane with a plurality of nano- or micro-sized pores, asymmetric electric fields can be effectively formed without interrupting the flow of a fluid and thus large quantities of samples can be processed.

Thus, the present invention provides an apparatus that can quickly analyze large quantities of polarizable target materials without interrupting the flow of a fluid.

The present invention also provides a method of separating a target material using the apparatus.

According to exemplary embodiments of the present invention, an apparatus separating a polarizable analyte using dielectrophoresis includes; a vessel including a membrane having a plurality of nano- to micro-sized pores, the membrane disposed inside the vessel, electrodes generating spatially non-uniform electric fields in the nano- to micro-sized pores of the membrane when an AC voltage is applied to the electrodes, and a power source applying the AC voltage to the electrodes, wherein a sectional area of the pores varies along a depth of the pores.

According to other exemplary embodiments of the present invention, a method of separating a target analyte in a sample, using the apparatus described above, includes contacting the membrane with the sample and separating the polarizable analyte in the sample using dielectrophoresis by applying the AC voltage to the electrodes from the power source to generate spatially non-uniform electric fields in the membrane.

BRIEF DESCRIPTION OF THE DRAWINGS

The above and other features and advantages of the present invention will become more apparent by describing in detail exemplary embodiments thereof with reference to the accompanying drawings, in which:

FIG. 12A is an image before an electric field is turned on, FIGS. 12B and 12C are images showing results after a 300 kHz, 1280 V/cm electric field is turned on for 1 min. (each ×10 and ×20 magnification, respectively), and FIG. 12D is an image illustrating captured bacteria flowing out when the electric field is turned off;

DETAILED DESCRIPTION OF THE INVENTION

Figure 1:
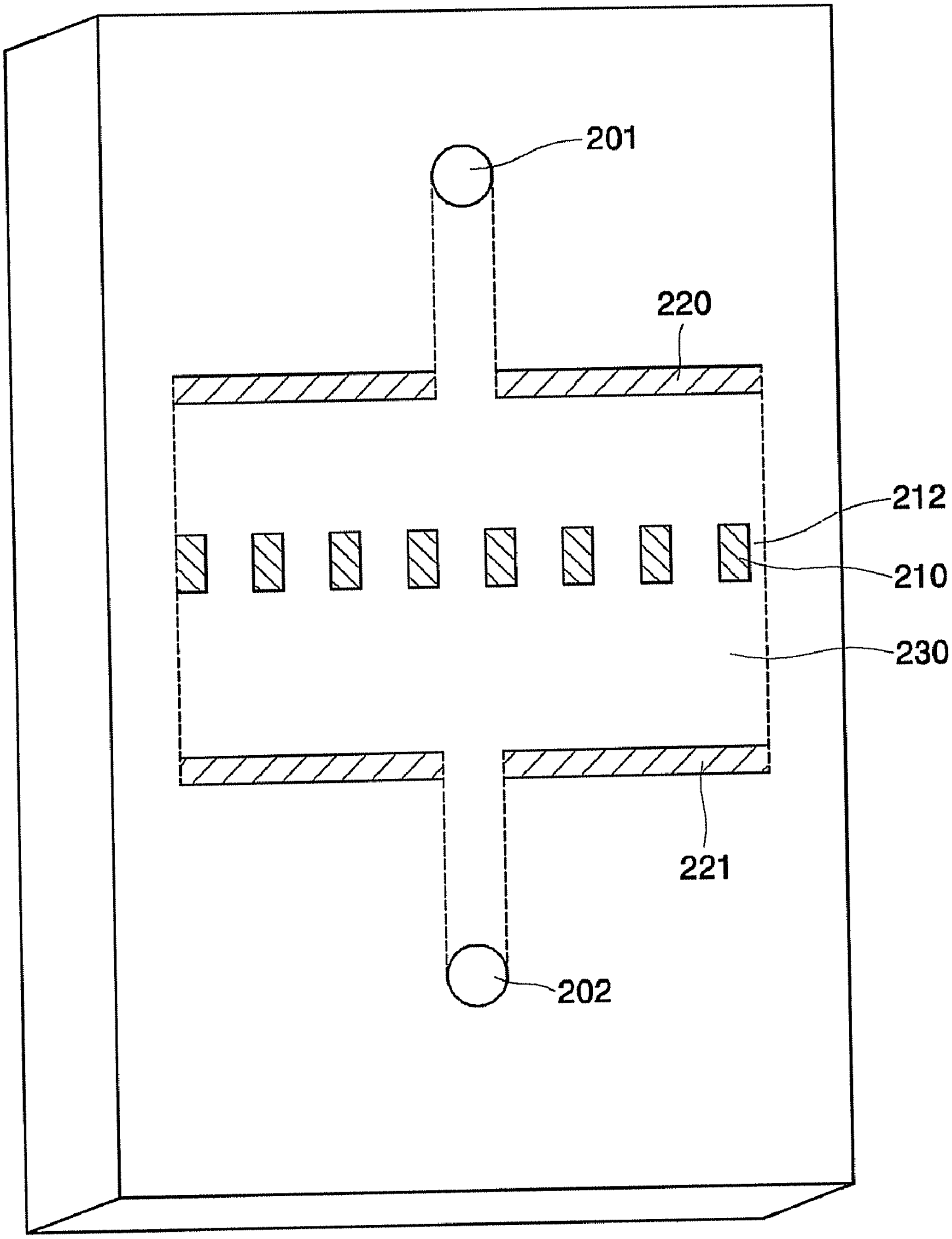
FIG. 1 is a schematic view of an exemplary embodiment of an apparatus according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the present invention will be described more fully with reference to the accompanying drawings, in which exemplary embodiments of the invention are shown.

An exemplary embodiment of an apparatus, such as a dielectrophoretic apparatus, for separating a polarizable analyte using dielectrophoresis according to the present invention includes a vessel which includes a membrane formed of a plurality of nano to micro-sized pores, the membrane being disposed inside the vessel, electrodes which generate spatially non-uniform electric fields in the nano- to micro-sized pores of the membrane when an AC voltage is applied thereto, and a power source applying the AC voltage to the electrodes, wherein the sectional area of the pores varies along the depth of the pores.

In exemplary embodiments, the vessel and the membrane may be formed of various materials. The vessel and the membrane may be formed of the same material or from different materials. In an exemplary embodiment, the vessel and the membrane may be formed of an insulating material. Exemplary embodiments of the insulating material include silicon wafer, glass, fusion silicon, SU-8 (photocurable epoxy resin), ultraviolet curable polymer, and plastic material, but are not limited thereto. The membrane may have various geometries, and preferably, may be perpendicular to the flow path direction or be disposed in a predetermined direction to the flow path direction of the fluid. Accordingly, the flow of the fluid is opposed by the membrane and the fluid flows through the nano- to micro-sized pores formed in the membrane. It should be understood that by "nano- to micro-sized pores", the pores are sized in the range of sizes most conveniently measurable in nanometers (nm) and micrometers (μm), and thus have dimensions measured in nanometers to micrometers.

In the present invention, the term "vessel" denotes a space that can contain a predetermined volume of fluid inside the apparatus. For example, the vessel may have the form of a channel or a microchannel. Conventionally, a "channel" or a "microchannel" is a region designed such that the fluid can flow from one end thereof to the other end thereof. The channel may have any shape, such as, but not limited to, a linear shape, a bended shape, or an arc shape. Also, a section of the channel may vary based on the length of the channel. The channel may be formed inside the apparatus in a closed shape or may be formed in an open shape in order to easily introduce and remove the sample.

In the apparatus, the thickness of the membrane formed inside the vessel may be in the range of about 0.1 micrometers (μm) to about 500 μm, but is not limited thereto. The diameter of the nano to micro-sized pores differs based on amplitude, frequency, or other similar attributes of an AC voltage applied between electrodes, but preferably, the smallest diameter of the pores may be in the range of about 0.05 μm to about 100 μm. The apparatus can be usefully used in separating a nano to micro-sized polarizable material when using the nano to micro-sized pores. The width and depth of the pores in absolute terms and relative terms can be easily deduced by one of ordinary skill in the art based on a target material and condition of separation.

The forming of the nano to micro-sized pores in the membrane can be performed using various methods well known in the related art. In exemplary embodiments, the nano to micro-sized pores can be formed using photolithography or anodization. The concentration of the pores can be determined based on a resistance to the flow of a fluid, the amount of an analyte that is to be processed, or the intensity of the non-uniform electric field that is to be applied on the pores. For example, the density of the pores may be in the range of about 1,000 pores/$cm^2$ to about 100,000 pores/$cm^2$.

In the exemplary embodiments of the apparatus, the sectional area of the pores changes in the depth direction of the pores, such as in the direction of the flow path. In other words, the sectional area of the pores formed parallel to the surface of the membrane or on a plane parallel to the surface of the membrane changes in the depth direction of the pores. In an exemplary embodiment, a portion of the membrane defining the pore may include a sharp edge with respect to the depth direction of the pore from the surface of the membrane to the opposite surface. Also, regarding a section formed by a plane perpendicular to the surface of the membrane and the membrane, a section formed by a line connecting a point defining the pore on the surface of the membrane and a point defining the pore on the opposite surface of the membrane may have various shapes, such as a triangular shape, a circular shape, a polygonal shape, an exponential function, a linear function, etc. Due to various possible shapes, the shape of the sectional area of the pores in the thickness direction of the membrane may differ. For example, the sectional area may decrease, increase, or be constant and decrease or increase. In exemplary embodiments, the sectional area may be minimum or maximum at a middle point in the thickness direction of the membrane or minimum or maximum at the surface of the membrane, but is not limited thereto.

The pores in the membrane may be formed substantially in parallel to each other with respect to the thickness direction of the membrane.

In the exemplary embodiments of the apparatus according to the present invention, the sectional area of the pores formed in the membrane may decrease from the surface of the membrane. Preferably, the sectional area may decrease from the surface of the membrane to a middle point in the thickness direction of the membrane. More preferably, the sectional area may continuously decrease from the surface of the membrane, decrease from the surface of the membrane to a middle point of thickness of the membrane and then be constant from the middle point of thickness of the membrane, or decrease from the surface of the membrane to a middle point of thickness of the membrane and then symmetrically increase from the middle point of thickness of the membrane. In this case, each pore formed on the membrane is parallel to the thickness direction of the membrane, and with regard to a section formed by a plane perpendicular to the surface of the membrane, wherein the surface is parallel to the thickness direction of the membrane and includes a line passing through the gravity point of the pores and a line connecting the point defining the pores in the surface of the membrane and the point defining the pores in the opposite surface of the membrane, a portion of the membrane defining the pores may be two symmetrical semicircles having a gravity center on the line passing through the middle point of the thickness direction of the membrane and parallel to the surface of the membrane, two symmetrical triangles having one vertex on the line passing through the middle point of the thickness direction of the membrane and parallel to the surface of the membrane, or may be formed so as to define a portion of pore as two symmetrical arcs having a gravity center on the line passing through the gravity center of the pores. That is, the sectional area of a section formed by the surface of the membrane in the depth direction of each pore or a plane parallel to the surface of the membrane may decrease toward the middle point of thickness of the membrane following an exponential function, a square root function, or a linear function, but is not limited thereto.

In other exemplary embodiments of the dielectrophoretic apparatus according to the present invention, the sectional area of the pores formed in the membrane may increase, rather than decrease, from the surface of the membrane. In such exemplary embodiments, the sectional area of the pores formed in the surface of the membrane may increase from the surface of the membrane to a middle point of thickness of the membrane. For example, the sectional area may continuously increase from the surface of the membrane to the point of thickness of the membrane, may increase from the surface of the membrane to the middle point of thickness of the membrane and be constant from the middle point of thickness of the membrane, or may increase from the surface of the membrane to the middle point of thickness of the membrane and symmetrically decrease from the middle point of thickness of the membrane.

An exemplary embodiment of the vessel in the exemplary embodiment of the apparatus according to the present invention may be a microchannel including the membrane disposed in a direction substantially perpendicular to the fluid flow path direction. Accordingly, the apparatus may be a microfluidic apparatus.

The electrodes within the apparatus provide a spatially non-uniform "asymmetrical electric field" in an area of the nano to micro-sized pores formed on the membrane inside the vessel. The "asymmetrical electric field" is an electric field having at least one maximum value or minimum value. Although the electric field may have an actual symmetrical pattern, the "asymmetrical electric field" in the present invention means that the electric field is asymmetrical in terms of an analyte in the apparatus. That is, one direction of the analyte receives a relatively small or large electric field compared to the other direction. The asymmetrical electric field can be obtained using various methods. In the exemplary embodiment, the asymmetrical electric field may be made by the plurality of nano to micro-sized pores formed in the membrane inside the vessel. Also, the asymmetrical electric field may be obtained only by the geometry of the electrodes. The electrodes may be formed of a material selected from various conductive materials, for example, metals, such as aluminum Al, gold Au, platinum Pt, copper Cu, silver Ag, tungsten W, titanium Ti, etc., metal oxides, such as indium tin oxide ("ITO"), tin oxide ("$SnO_2$"), etc., electro conductive plastics, and metal impregnated polymers. The electrodes may be spaced apart from the membrane at various intervals, or may be installed to contact the membrane. The location of the electrodes may differ according to a target material, a purpose of separation, etc. Preferably, the electrodes are spaced apart from the membrane inside the vessel.

In the exemplary apparatus, the power source is connected to the electrodes in order to supply an AC voltage to the electrodes. When the AC voltage is applied to the electrodes, the asymmetrical electric field having at least one maximum value or minimum value is generated, thereby supplying a dielectrophoresis force on the polarizable materials in the sample placed in the apparatus. The polarizable materials are supplied with different dielectrophoresis forces based on their polarity, volume, etc. The locations where the polarizable materials are separated may differ based on the polarity.

The power source can apply voltages in various ranges and various frequencies to the electrodes based on genetic properties of the target material required to be separated, properties of a medium, etc. The frequency may be in the range of about 1 Hz to about 1 GHz, and preferably, in the range of about 100 Hz to about 20 MHz. Also, a peak-to-peak ("pp") voltage may be in the range of about 1 V to about 1 kV. The power source may be connected to a power electronic device, such as a power amplifier, or a power conditioning device.

The exemplary embodiments of the apparatus may include various components (hereinafter, referred to as modules) according to its usage. For example, the apparatus may include: a sample injection port; a sample introduction and removal module; a cell handling module; a separation module, such as electrophoresis, gel filtration, or ion-exchange chromatography; a reaction module for chemical or biological transformation of the sample, including amplification of the target analyte, such as polymerase chain reaction ("PCR"); a liquid pump; a fluid valve; a thermal module for heating and cooling; a storage module for the sample analysis; a mixing chamber; and a detection module, but are not limited thereto.

An exemplary embodiment according to the present invention includes a method of separating a target analyte in a sample using an apparatus for separating a polarizable analyte using dielectrophoresis, the apparatus including a vessel which includes a membrane formed of a plurality of nano- to micro-sized pores, the membrane being disposed inside the vessel, electrodes which generate spatially non-uniform electric fields in the nano to micro-sized pores of the membrane when an AC voltage is applied thereto, and a power source applying the AC voltage to the electrodes, wherein the sectional area of the pores formed in the surface of the membrane or in a plane parallel to the surface varies along the depth thereof, the method including contacting the membrane formed of nano to micro-sized pores with the sample and separating the polarizable analyte in the sample using dielectrophoresis by applying the AC voltage to the electrodes from the power source in order to generate the spatially non-uniform electric fields in the membrane formed of the nano to micro-sized pores.

Contacting the membrane, formed of nano to micro-sized pores, with the sample can be done by moving the sample using a pump installed inside (an on-chip-pump) or outside (an off-chip-pump) the apparatus. Preferably, the pump may be installed inside the apparatus. Generally, the pump is based on the electrodes. That is, the application of an electric field can be used to transfer a particle with an electric charge and bulk solvent according to the sample composition and the apparatus. Examples of the on-chip-pump include an electroosmotic ("EO") pump, an electrohydrodynamic ("EHD") pump, and a magnetohydrodynamic ("MHD") pump, but are not limited thereto. The pump based on the electrodes is also called an electrokinetic ("EK") pump.

The exemplary embodiment of the method according to the present invention also includes applying an AC voltage to the electrodes from the power source so that a spatially non-uniform electric field is generated in the vicinity of the nano to micro-sized pores of the membrane, thus separating polarizable materials from the sample via dielectrophoresis ("DEP"). DEP is the process by which polarizable particles are drawn toward an electric field maximum or minimum. The DEP force depends on the volume and dielectric properties of the particles. Depending on the relative complex permittivities of the analyte and the sample medium, the target analyte will either be attracted to (positive DEP) or repelled from (negative DEP) the electric field maximum. Some target analytes will experience neither positive DEP nor negative DEP in the same medium depending on the frequency of the applied electric field. Thus, in the exemplary embodiment of the method of separating a target analyte, the asymmetric electric field is generated by nano to micro-sized pores of the membrane, and the intensity and frequency of the electric field need to be sufficiently controlled in order to manipulate the chosen analyte. One of ordinary skill in the art can easily optimize the above conditions and therefore the present invention is not limited to specific conditions.

In the exemplary embodiment of the method, the expression "the target material is separated" means that the target material is highly enriched at a specific point in the microfluidic apparatus, or that the enriched target material is eluted to the outside. Thus, the exemplary embodiment of the method may further include detecting the target material that is enriched at a specific point in the apparatus. The detection may be performed using conventional methods, such as identifying a target material using a probe material that binds the target material. In addition, the method may include eluting the target material that is enriched at a specific point in the apparatus to the outside. In the eluting process, non-target materials are first removed by washing with a washing solution, and then, the target material that is enriched at a specific point in the apparatus of the present invention is eluted. The elution may be performed with a material having a CM factor approximately equal to 0, or performed by washing when the voltage is removed.

The target analyte may be formed of a material selected from a group including a cell, a virus, a nanotube, and a microbead, but is not limited thereto.

FIG. 1 is a schematic view of an exemplary embodiment of an apparatus according to the present invention. An inlet port 201 is connected to an outlet port 202 through a microchannel 230. The microchannel 230 includes a membrane 210 which has a plurality of nano to micro sized pores 212 and is disposed in a direction substantially perpendicular to a fluid flow direction from the inlet port 201 to the outlet port 202. A first electrode 220 and a second electrode 221 are respectively separated from the membrane 210 by a predetermined distance. A power source (not shown) is connected to the first and second electrodes 220 and 221. In addition, other devices, such as a detector, can be selectively included in the apparatus according to the exemplary embodiment of the present invention. In FIG. 1, the exemplary embodiment of the apparatus according to the present invention is shown as an example. However, the pores can have various shapes. Accordingly, the scope of the present invention is not limited by the shape, structure, and size of the pores illustrated herein. In addition, the absolute and relative widths of the pores and depths of the pores can be easily controlled by one of ordinary skill in the art according to the target material to be separated and conditions thereof. The depth of the pores may be equal to the thickness of the membrane, and may be in the range of about 0.1 μm to about 500 μm.

Figure 2A:
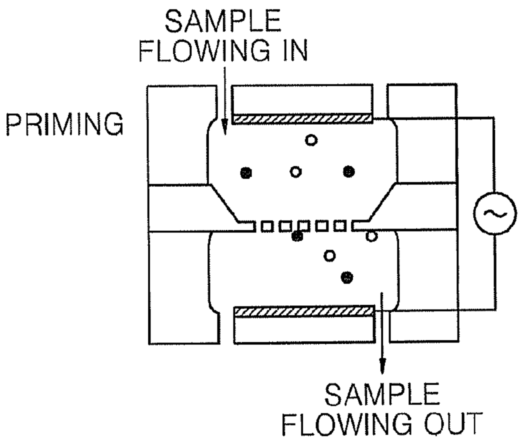
FIGS. 2A to 2D are schematic representations illustrating steps of an exemplary embodiment of a method for enriching or separating a material via (+) dielectrophoresis ("DEP") using the exemplary embodiment of an apparatus of FIG. 1.
Figure 2B:
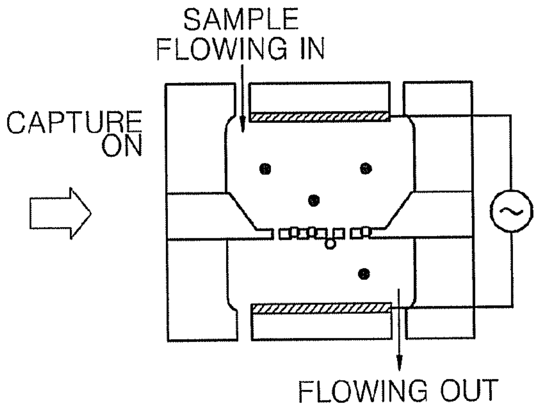
Figure 2C:
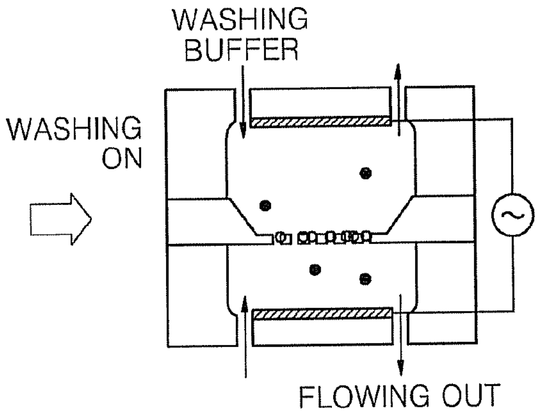
Figure 2D:
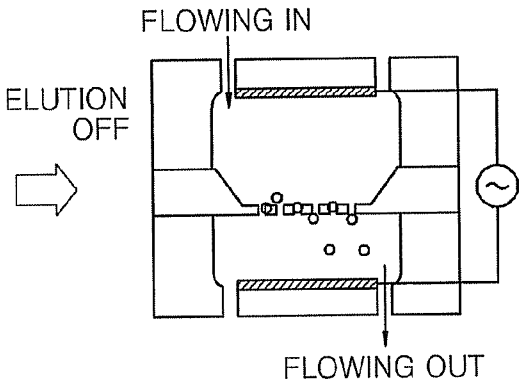

FIGS. 2A to 2D illustrate steps of an exemplary embodiment of a method for enriching or separating a material via a (+) DEP using the exemplary embodiment of the apparatus of FIG. 1. The separation of a material using the apparatus of FIG. 1 may be performed by first injecting a sample fluid into the apparatus (priming), as shown in FIG. 2A. Then, as shown in FIG. 2B, the method includes generating a spatially asymmetric electric field by a power source to trap cells, molecules, or particles in the pores, wherein the asymmetric electric field remarkably changes in the edge of the pores of the membrane or a portion where the sectional area of the pores is small so that only material with a (+) DEP property is trapped in the edge of the pores or the portion where the sectional area of the pores is small and other materials pass through the pores. Then, as shown in FIG. 2C, the method includes washing the top and bottom of the membrane with a washing buffer. As shown in FIG. 2D, the method then includes removing the spatially asymmetric electric field by turning off the power source, and eluting the enriched target material from the apparatus. Although FIG. 2D illustrates an operation of eluting the target material, the eluting of the target material is not necessary. That is, the target material can be detected using a detector installed in the membrane and then used in analysis.

Figure 11:
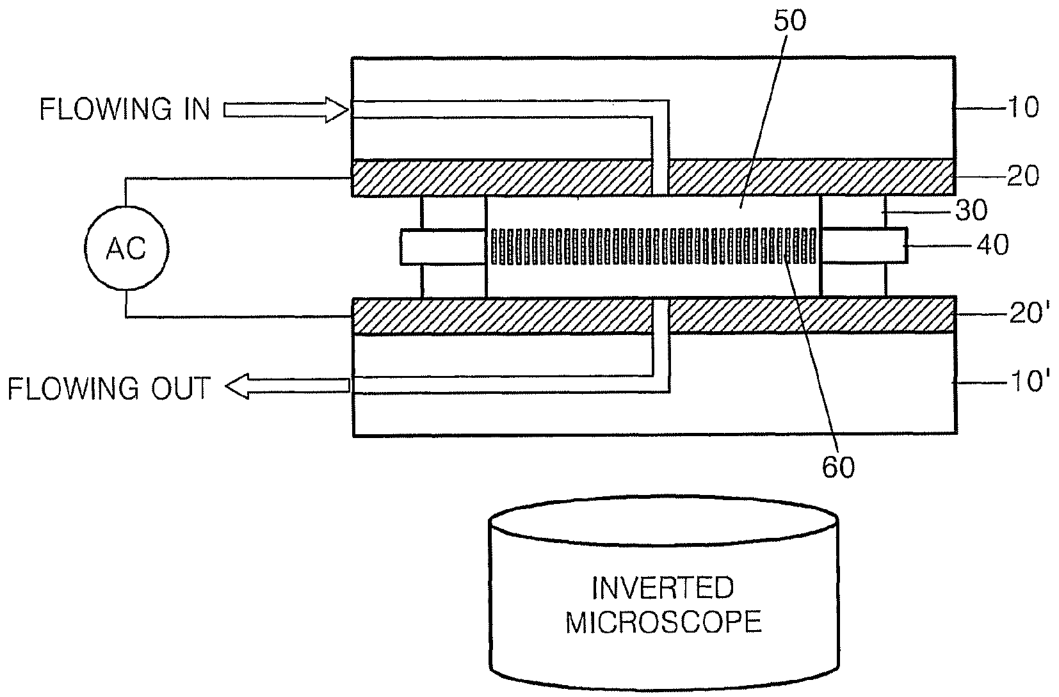
FIG. 11 is a schematic diagram illustrating an exemplary embodiment of an apparatus for separating a polarizable analyte using dielectrophoresis according to another exemplary embodiment of the present invention.

FIG. 11 is a schematic diagram illustrating an exemplary apparatus for separating a polarizable analyte using dielectrophoresis according to another exemplary embodiment of the present invention. A chamber 50 is formed by an upper substrate 10 coated with a first electrode 20, a lower substrate 10' coated with a second electrode 20', and a sidewall 30. The chamber 50 includes a membrane 40 having nano to micro sized pores 60. The chamber 50 is connected to an inlet port and an outlet port. The inlet port may extend through the first electrode 20 and the upper substrate 10, and the outlet port may extend through the second electrode 20' and the lower substrate 10'. The upper and lower substrates 10 and 10' and the electrodes 20 and 20' may each be formed of polycarbonate and indium tin oxide ("ITO"), and the sidewall 30 and the membrane 40 may be formed of a silicon gasket or SU-8 (photocurable epoxy resin). Also, an inverted microscope can be located in view of the pores 60 of the membrane 40, such that the separation of the material can be optically observed.

EXAMPLES

The present invention will be described in greater detail with reference to the following examples. The following examples are for illustrative purposes only and are not intended to limit the scope of the invention.

Example 1

Change of Electric Field in Two-dimensional Columnar Structure and Three-Dimensional Pore Structure Changes of electric fields and sizes of dielectrophoresis forces in a two-dimensional columnar structure and a three-dimensional pore structure were observed using computational fluid dynamics and multi-physics software CFD-ACE (CFD Research, Huntsville, Ala.).

Figure 3:
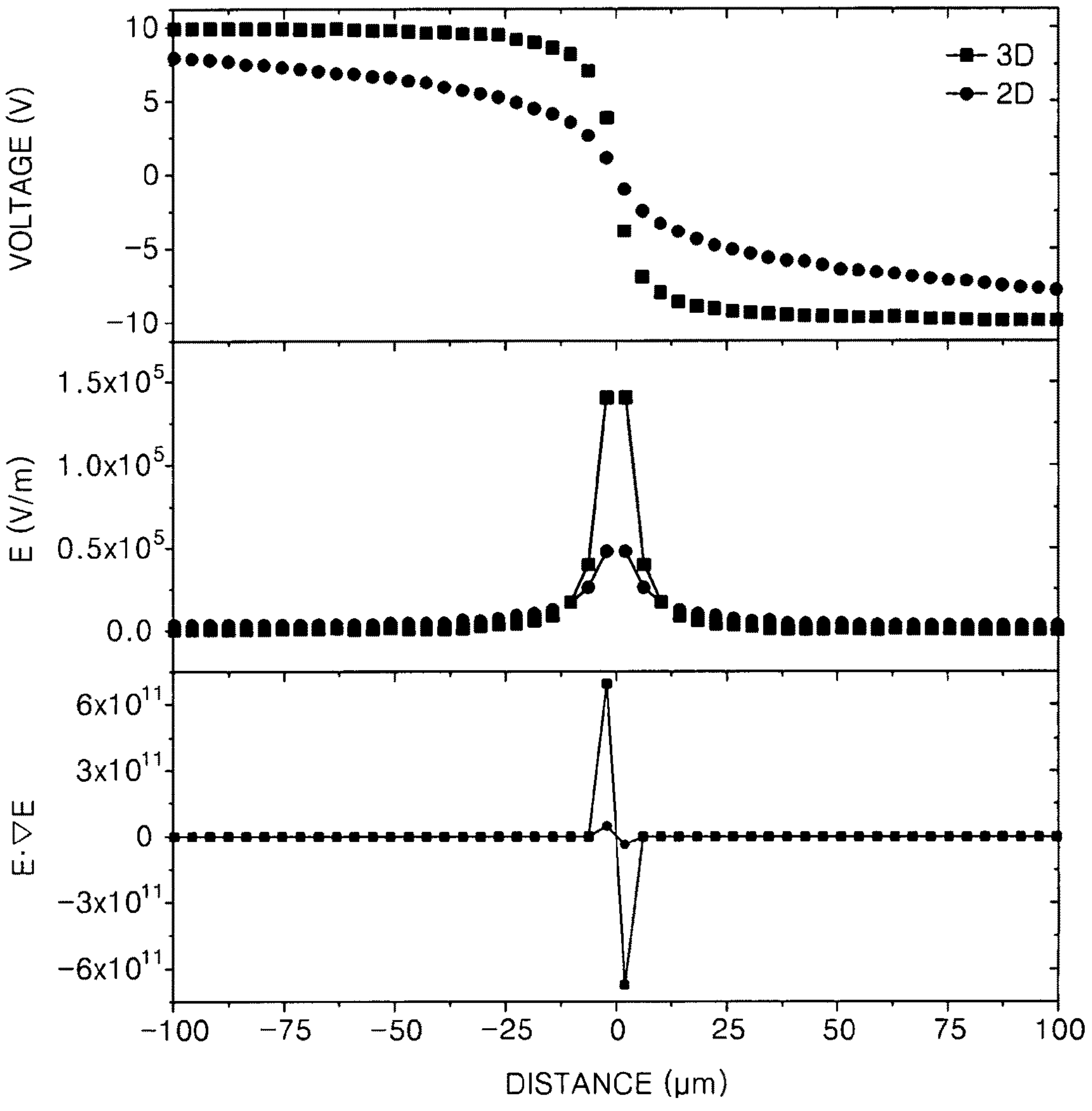
FIG. 3 is a graph illustrating voltage, electric fields, and maximum dielectrophoresis forces with respect to a gap or a distance from a pore central unit in a two-dimensional columnar structure and a three-dimensional pore structure.

FIG. 3 is a graph illustrating voltages, electric fields, and maximum dielectrophoresis forces with respect to a gap or a distance from a pore central unit in a two-dimensional columnar structure and a three-dimensional pore structure. As shown in FIG. 3, changes of the voltage, the electric field, and the maximum dielectrophoresis force in the vicinity of the pores or in the middle point of the distance, such as the distance from the pore central unit at 0 μm, were remarkable in the three-dimensional pore structure as compared to the two-dimensional columnar structure. FIG. 3 illustrates that materials are easily separated in the three-dimensional pore structure since non-uniform electric fields can be easily formed. In FIG. 3, 3D denotes the three-dimensional pore structure and 2D denotes the two-dimensional columnar structure.

Figure 4:
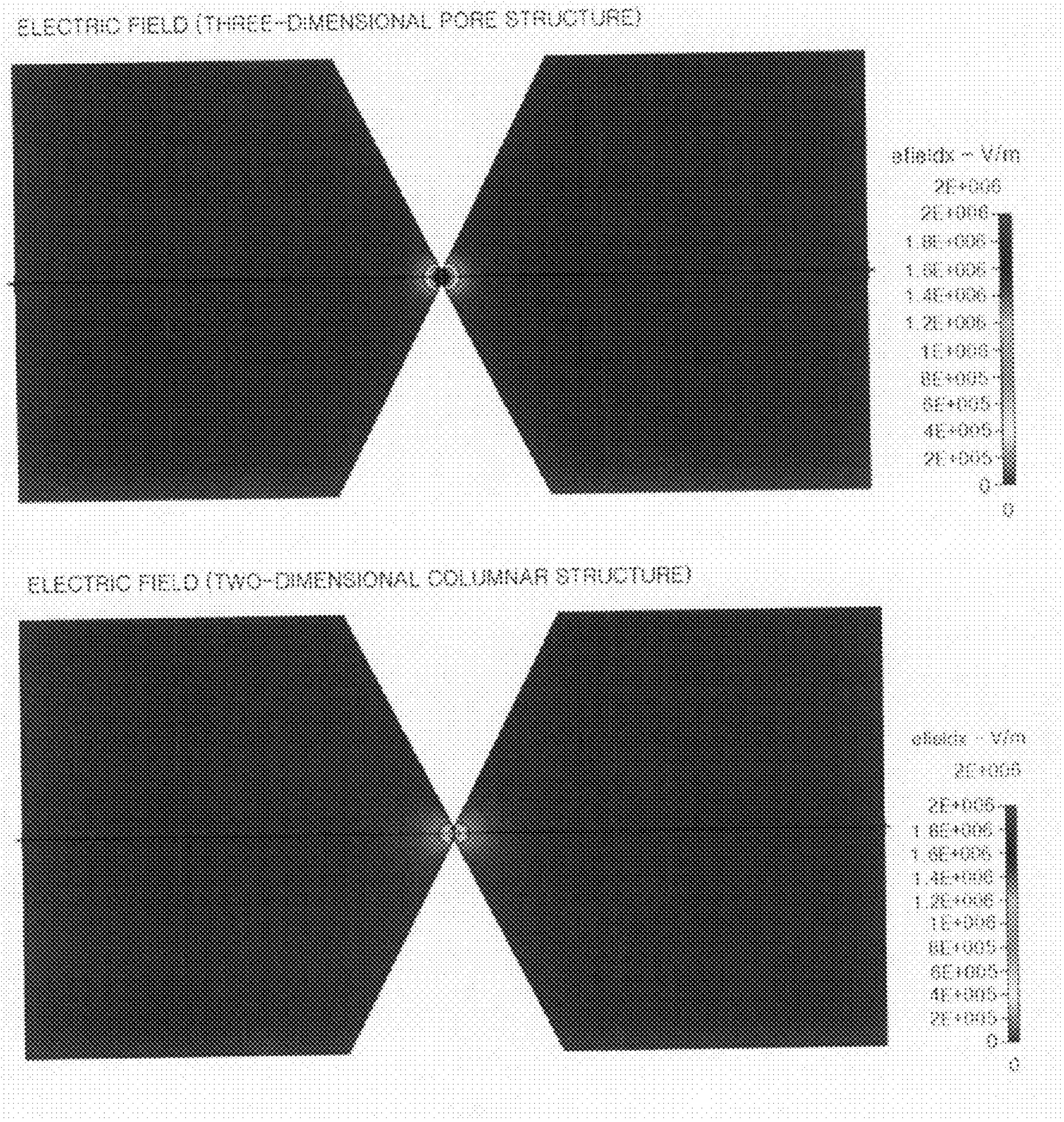
FIG. 4 is a diagram illustrating the electric fields in the two-dimensional columnar structure and the three-dimensional pore structure of FIG. 3.

FIG. 4 is a diagram illustrating the electric fields in the two-dimensional columnar structure and the three-dimensional pore structure of FIG. 3.

Figure 5A:
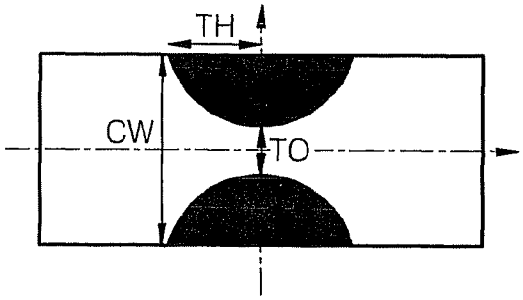
FIGS. 5A through 5E are schematic longitudinal cross-sectional views of exemplary embodiments of pores according to the present invention.
Figure 5B:
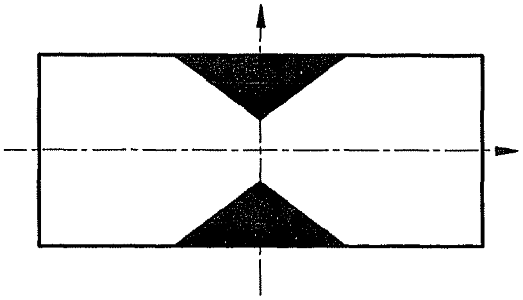

In FIGS. 3 and 4, the two-dimensional columnar structure used in a simulation was a columnar structure having a symmetrical triangular shape as shown in FIG. 5B, in top view of the column (IEEE Eng. Med. Biol. Mag. 2003, 22(6), 62-67, FIG. 3). The three-dimensional pore structure in FIGS. 3 and 4 had the same size as the two-dimensional columnar structure, but had pores, instead of gaps. In the two-dimensional columnar structure and the three-dimensional pore structure, a section defining the gap between the columns in the two-dimensional columnar structure or a section of the membrane defining the pores in the three-dimensional pore structure had the triangular shape as shown in FIG. 5B, and the details are shown in Table 1 below.

TABLE 1

| Variable | Value |
|---|---|
| CW | 200 μm |
| TO | 5 μm |
| TH | 50 μm |
| RTO | 0.025 |
| RTH | 0.25 |
| TO/TH | 0.1 |

Here, CW is a channel width, TH is a trap height, TO is a trap hole, RTO is TO/CW, and RTH is TH/CW.

Referring to FIGS. 3 and 4, the dielectrophoresis force Max ($\nabla E^2$) values were $6.91\times10^{17}$ $V^2/m^3$ in the case of the three-dimensional pore structure and $3.96\times10^{16}$ $V^2/m^3$ in the case of the two-dimensional columnar structure. Accordingly, the dielectrophoresis force Max ($\nabla E^2$) value of the three-dimensional pore structure was approximately 17 times higher than the dielectrophoresis force Max ($\nabla E^2$) value of the two-dimensional columnar structure.

This is because the dielectrophoresis force was proportionate to $\nabla E^2$, and in the two-dimensional columnar structure, the electric field changed only in one direction (y direction), and thus $\nabla E^2$ was Ey*GradEy (that is, Grad Ex and Grad Ez is 0), whereas in the three-dimensional pore structure, $\nabla E^2$ was Ey*GradEy+Ez*GradEz. However, the present invention is not limited to a specific mechanism.

The membrane including the pores having the symmetrical triangular shapes as shown in FIG. 5B was used, wherein the CW was changed from 200 μm to 1,000 μm, the RTO (=TO/CW) was changed from 0.025 to 0.25, and the RTH (=TH/CW) was changed from 0.025 to 0.25. The density of the pores was 517 pores/diameter 5 mm in the circular membrane.

Figure 7:
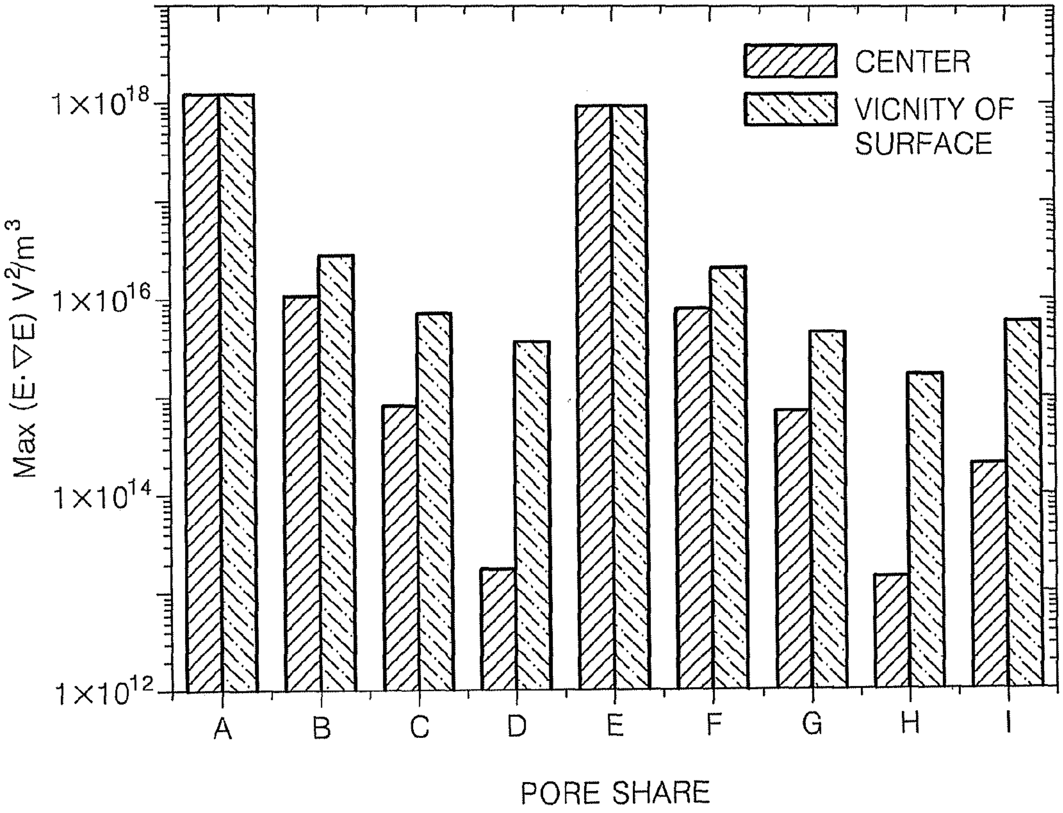
FIG. 7 is a graph illustrating maximum dielectrophoresis forces with respect to channel width ("CW"), trap height ("TH") and trap hole ("TO") of pores.

FIG. 7 is a graph illustrating the maximum dielectrophoresis forces with respect to CW, TH, and TO. The variables used in FIG. 7 are shown in Table 2. In FIG. 7, the "surface" is a location at 0 μm from the surface of the membrane and the "vicinity of center" is a location at 5 μm from the surface of the membrane.

TABLE 2

| Variable | A | B | C | D | E | F | G | H | I |
|---|---|---|---|---|---|---|---|---|---|
| CW (μm) | 200 | 1,000 | 200 | 1,000 | 200 | 1,000 | 200 | 1,000 | 600 |
| TO (μm) | 5 | 25 | 50 | 250 | 5 | 25 | 50 | 250 | 82.5 |
| TH (μm) | 5 | 25 | 5 | 25 | 50 | 250 | 50 | 250 | 82.5 |
| RTO (=TO/CW) | 0.025 | 0.025 | 0.25 | 0.25 | 0.025 | 0.025 | 0.25 | 0.25 | 0.1375 |
| RTH (=TH/CW) | 0.025 | 0.025 | 0.025 | 0.025 | 0.25 | 0.25 | 0.25 | 0.25 | 0.1375 |
| TO/TH | 1 | 1 | 10 | 10 | 0.1 | 0.1 | 1 | 1 | 1 |
| E Grad E (Surface) | $1.25 \times 10^{18}$ | $1.11 \times 10^{16}$ | $8.14 \times 10^{14}$ | $1.81 \times 10^{13}$ | $9.66 \times 10^{17}$ | $8.11 \times 10^{15}$ | $7.24 \times 10^{14}$ | $1.47 \times 10^{13}$ | $2.09 \times 10^{14}$ |
| E Grad E (5 μm from Surface) | $1.25 \times 10^{18}$ | $2.90 \times 10^{16}$ | $7.10 \times 10^{15}$ | $3.60 \times 10^{15}$ | $9.66 \times 10^{17}$ | $2.00 \times 10^{16}$ | $4.70 \times 10^{15}$ | $1.64 \times 10^{15}$ | $6.02 \times 10^{15}$ |

Example 2

Change of Maximum Dielectrophoresis Force Based on Pore Shapes in Three-Dimensional Pore Structure Change of the maximum dielectrophoresis force based on pore shapes in the three-dimensional pore structure was observed using CFD-ACE (CFD Research, Huntsville, Ala.).

FIGS. 5A through 5E are schematic diagrams illustrating pores used in the example, which are longitudinal sectional drawings of each pore shape. CW is 200 μm, TH is 75 μm, and TO is 50 μm in each pore. Looking at the pore shapes in the longitudinal sectional drawings, FIG. 5A has a symmetrical semicircular shape, FIG. 5B has a symmetrical triangular shape, FIG. 5C has an asymmetrical triangular shape, FIG. 5D has a rectangular shape, and FIG. 5E has a symmetrical arc shape.

Figure 6:
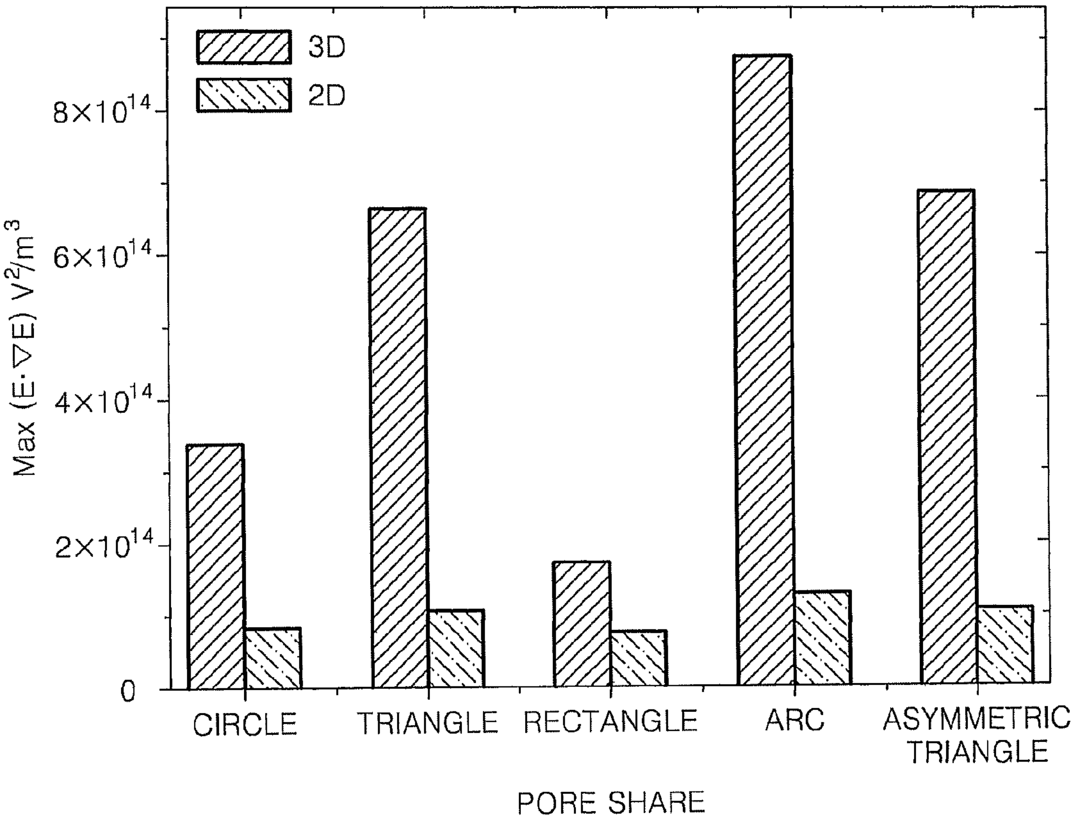
FIG. 6 is a graph illustrating maximum dielectrophoresis forces with respect to shapes of a pore.

FIG. 6 is a graph illustrating maximum dielectrophoresis forces with respect to the pore shapes. As shown in FIG. 6, the maximum dielectrophoresis force was remarkably high when a portion of the pore hole had a sharp edge. For example, the maximum dielectrophoresis force was higher when the pore shapes were in symmetric and asymmetric triangular shapes. In FIG. 6, 3D is the three-dimensional pore structure and 2D is the two-dimensional columnar structure.

Example 3

Change of Maximum Dielectrophoresis Forces Based on Pore Dimension in Three-Dimensional Pore Structure Changes of the maximum dielectrophoresis forces were observed according to the pore dimension in the three-dimensional pore structure. In the current example, the pore had a triangular shape in the portion of the membrane defining the pores as shown in FIG. 5B. The CW, TH, and TO measurements were varied while observing the changes of the maximum dielectrophoresis forces.

Figure 8:
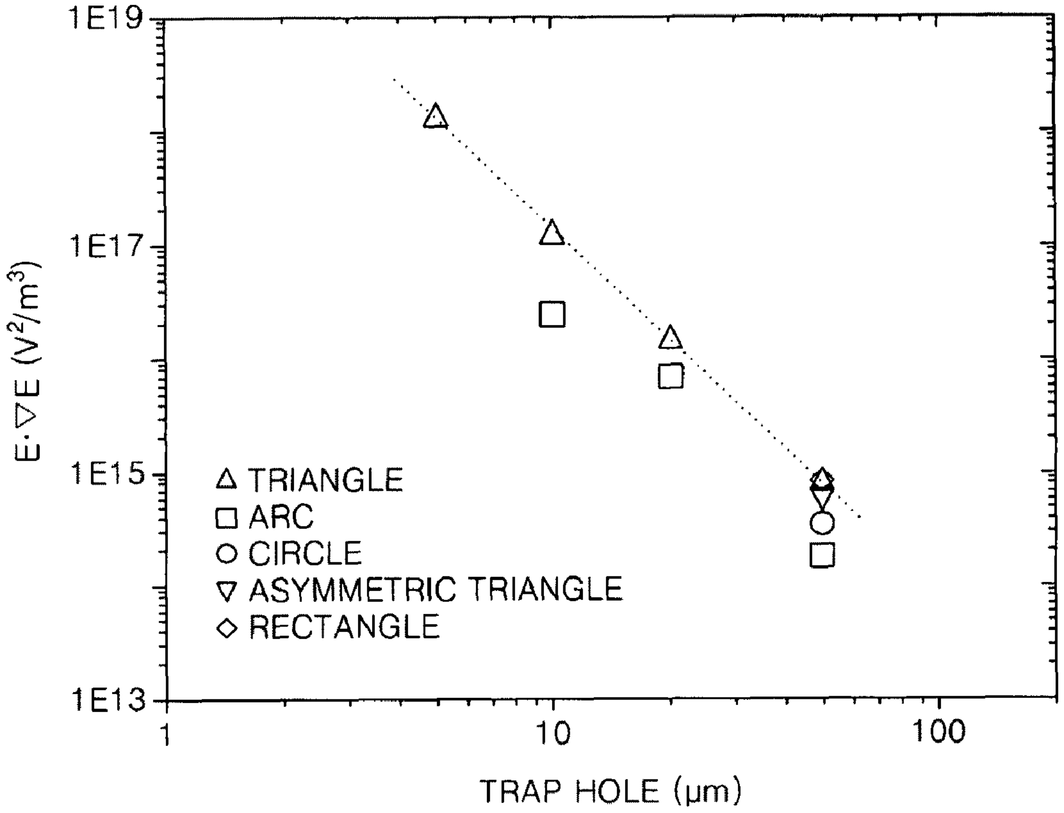
FIG. 8 is a graph illustrating maximum dielectrophoresis forces with respect to sizes of a trap hole and shapes of a pore.

FIG. 8 is a graph illustrating maximum dielectrophoresis forces with respect to sizes of a trap hole TO and pore shapes. As shown in FIG. 8, when the pores had an arc or triangular shapes in longitudinal cross section, the maximum dielectrophoresis force was 2 to 5 times higher than the maximum dielectrophoresis force when the pores had rectangular shapes. Also, as TO decreased, the maximum dielectrophoresis force increased. In this case, the maximum dielectrophoresis force can be expressed as $TO^n$, wherein n is about −3.16. When TO was 5 μm, the maximum dielectrophoresis force was 1500 times higher than when TO was 50 μm, and when TO was 10 μm, the maximum dielectrophoresis force was 140 times higher than when TO was 50 μm. Also, as trap height TH decreased, the maximum dielectrophoresis force increased, but the effect was very small. When TH was 5 μm, the maximum dielectrophoresis force was 1.1 to 1.3 times higher when TH was 50 μm.

Example 4

Effects of Frequency, Voltage and Flow Rate while Separating a Sample including Bacteria Using an Exemplary Embodiment of a Dielectrophoresis Apparatus Including a Membrane Having Pores which Changes Sectional Area According to the Present Invention In the current example, bacteria were separated from a sample using the exemplary embodiment of a dielectrophoretic apparatus shown in FIG. 11.

In the dielectrophoretic apparatus shown in FIG. 11, the substrates and electrodes were each formed of polycarbonate and indium tin oxide ("ITO"), and the sidewall and the membrane were formed of silicon gasket and SU-8 (photocurable epoxy resin). An inverted microscope was installed at a location in view of the pores 60 of the membrane 40, such that the separation of the material could be optically observed. The apparatus had a three-dimensional pore structure, and the pores had the triangular shapes as shown in FIG. 5B.

Figure 9:
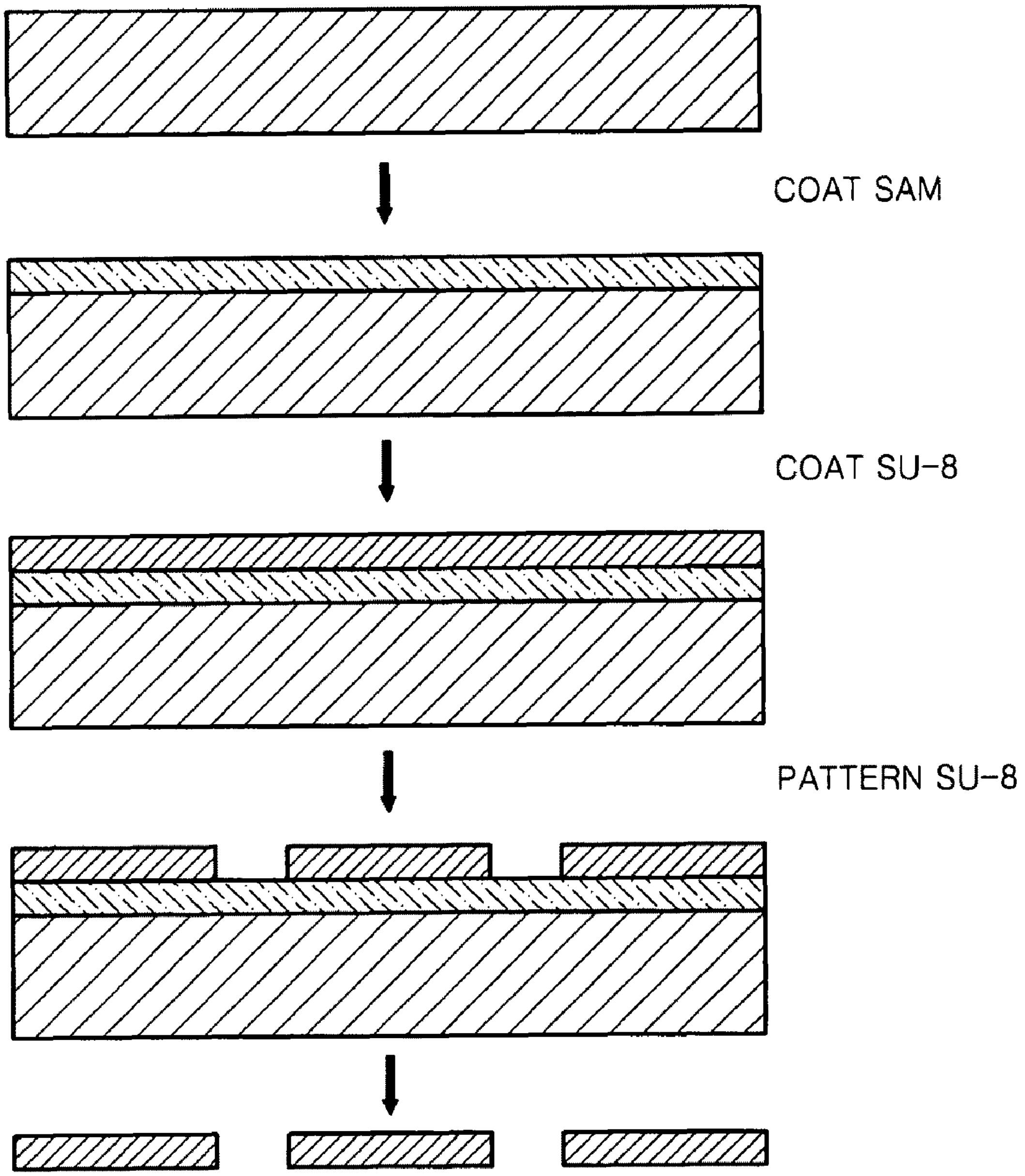
FIG. 9 is a flowchart showing an exemplary embodiment of a formation of a pore on an exemplary membrane formed of SU-8 (PHOTOCURABLE EPOXY RESIN)

The membrane in the apparatus was an SU-8 (photocurable epoxy resin) membrane. FIG. 9 is a flowchart illustrating an exemplary embodiment of a formation method of a pore on a membrane formed of SU-8 (photocurable epoxy resin). First, a self assembled monolayer ("SAM") of polyethyleneimine trimethoxy silane ("PEIM") was coated on a silicon wafer substrate. Then, SU-8 2100 (MicroChem Corporation) was spin coated at 1500 rpm in order to form a single coating membrane. Accordingly, the resultant was soft baked. Next, an SU-8 membrane including pores was formed by patterning the soft baked resultant and removing the substrate and the SAM. The SU-8 membrane was a negative photoresist such as a negative epoxy based near-UV photoresist. The SU-8 is transparent and has excellent mechanical intensity when deposited.

Figure 5C:
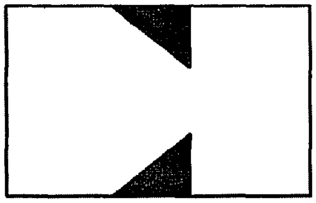
Figure 5D:
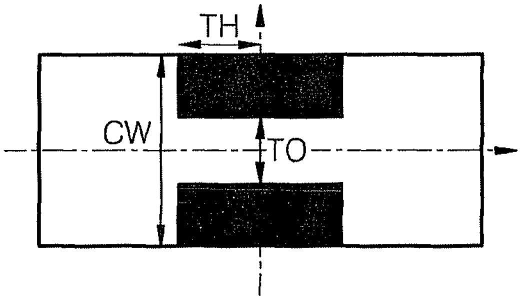
Figure 5E:
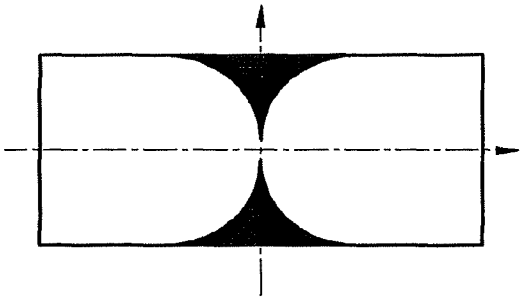
Figure 10:
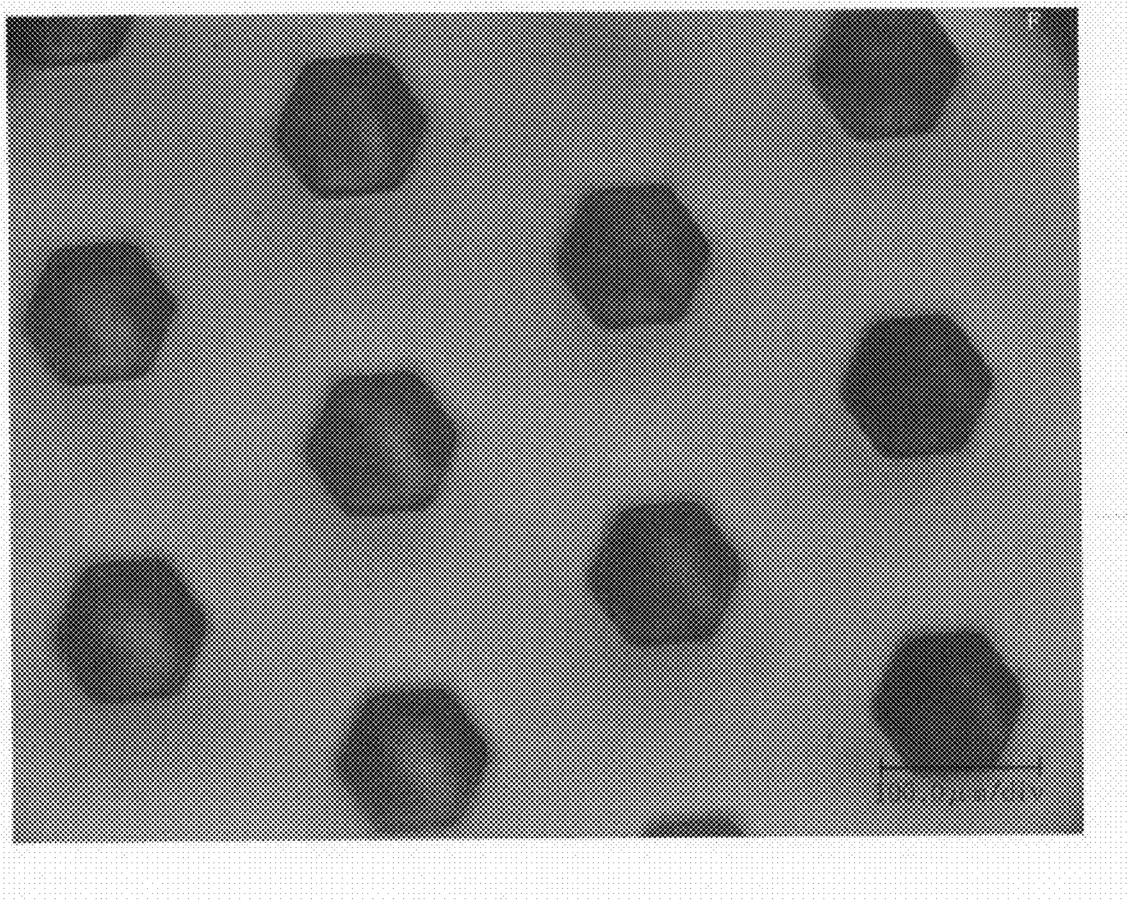
FIG. 10 illustrates an exemplary embodiment of a membrane having pores.

FIG. 10 is a diagram illustrating an exemplary embodiment of a membrane having pores. As shown in FIG. 10, pores which include hexagonal sections were formed, wherein a length of one side was 50 μm, the inlet diameter of the pore was 75 μm, and the outlet diameter was 50 μm. The thickness of the membrane was 200 μm, and 517 pores were formed on the membrane in a circular shape having 5 mm diameter. Accordingly, the density of the pores was 658 pores/$cm^2$. The longitudinal section of the pores formed on the SU-8 membrane had an asymmetrical triangular shape as shown in FIG. 5C. The volume of the chamber was 90 microliters (μl).

The SU-8 membrane was installed in the chamber of the apparatus shown in FIG. 11, the sample including bacteria was injected through the inlet, and voltage was applied in order to separate the bacteria.

As the sample, *E. coli* $1\times10^7$ cells/ml distilled water solution was used, which was injected at 100 μl/min., while applying a voltage having an electric field of 128 V/mm and a frequency of 300 kHz. The *E. coli* was dyed with SYTO-9, and after injecting the *E. coli* $1\times10^7$ cells/ml distilled water solution through each pore for 1 min., separation of the bacteria was observed using the inverted microscope.

FIGS. 12A through 12D are photographs illustrating the results of flowing the *E. coli* $1\times10^7$ cells/ml distilled water solution into the apparatus at 100 μl/min.

Figures 12A, 12B, 12C, 12D:
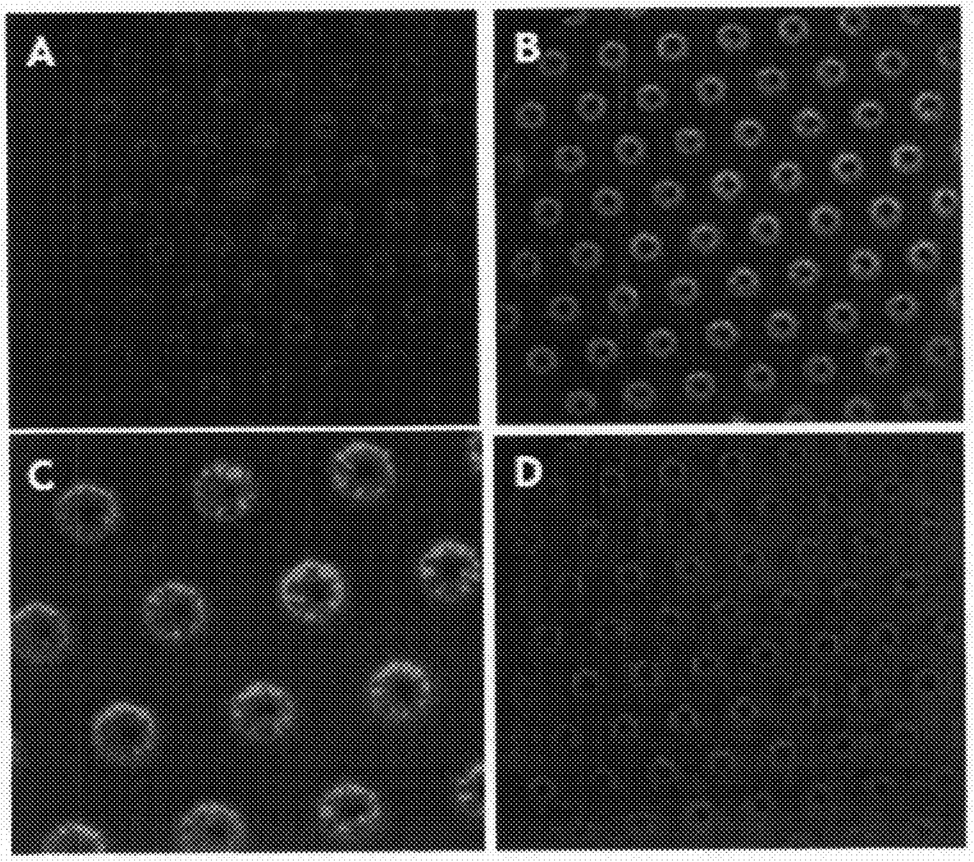
FIGS. 12A through 12D are images illustrating the results of flowing *E. coli* $1\times10^7$ cells/ml distilled water solution into an exemplary embodiment of the apparatus of the present invention at 100 μl/min, where

As shown in FIGS. 12A through 12D, the bacteria were captured in the center of the edge of the pores. FIG. 12A is a photograph before an electric field was applied and the *E. coli* $1\times10^7$ cells/ml distilled water solution was injected at 100 μl/min. FIG. 12B is a photograph of the result after a frequency of 300 kHz, 1280 V/cm electric field was applied for 1 min. while the *E. coli* $1\times10^7$ cells/ml distilled water solution was injected at 100 μl/min. FIG. 12C is an enlarged photograph of FIG. 12B, showing each *E. coli* captured on the edge of the pores. FIG. 12D is a photograph illustrating captured bacteria flowing out when the electric field was removed. As shown in FIGS. 12C and 12D, the bacteria were captured in the center of the edge of the pores.

Also, in the current example, a voltage was applied by changing its frequency to observe the effect of the voltage frequency on bacteria separation. The *E. coli* $1\times10^7$ cells/ml distilled water solution was injected at 50 μl/min, the electric field was 128 V/mm, and the voltage frequency ranged from 10 kHz to 10 MHz. The *E. coli* was dyed with SYTO-9, and after injecting the *E. coli* $1\times10^7$ cells/ml distilled water solution through each pore for 1 min., separation of the bacteria was observed using the inverted microscope.

Figure 13:
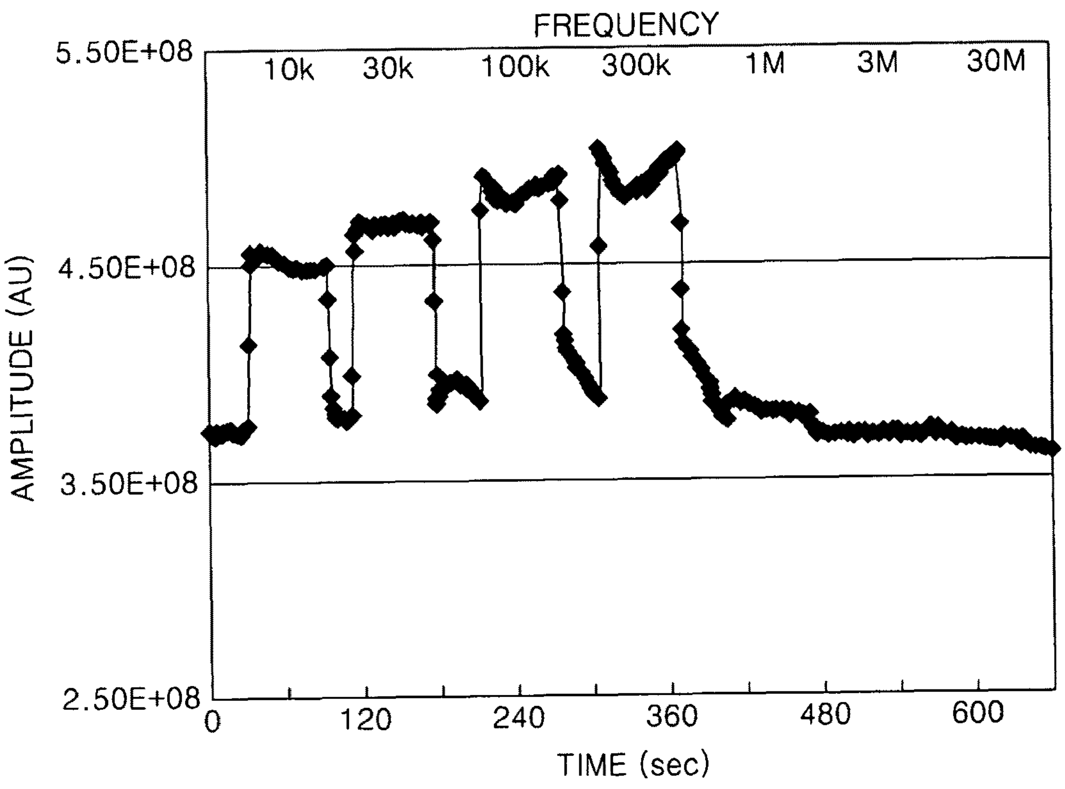
FIG. 13 is a graph illustrating bacteria separation according to voltage frequency.

FIG. 13 is a graph illustrating bacteria separation according to voltage frequency. Referring to FIG. 13, the corresponding voltage frequency was applied for 60 sec. to capture bacteria in the pores. Next, the voltage was removed for 30 sec. in order to elute the captured bacteria. The above process was repeated.

Figure 14:
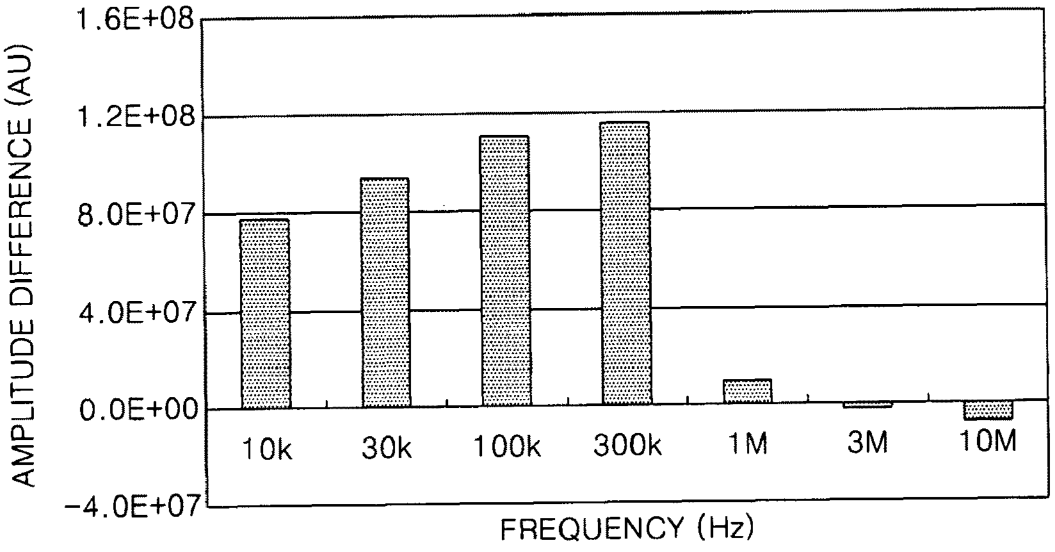
FIG. 14 is a graph of bacteria separation according to voltage frequency illustrated as fluorescence intensity according to each frequency.

FIG. 14 is a graph of bacteria separation according to voltage frequency illustrated as fluorescence intensity according to each frequency.

Also, in the current example, a voltage was applied by changing its amplitude to observe the effects of the voltage amplitude on bacteria separation. The *E. coli* $1\times10^7$ cells/ml distilled water solution was injected at 50 μl/min, frequency was 300 kHz, and voltage ranged from 32 V/mm to 128 V/mm. The *E. coli* was dyed with SYTO-9, and after injecting the *E. coli* $1\times10^7$ cells/ml distilled water solution through each pore for 1 min., separation of the bacteria was observed using the inverted microscope.

Figure 15:
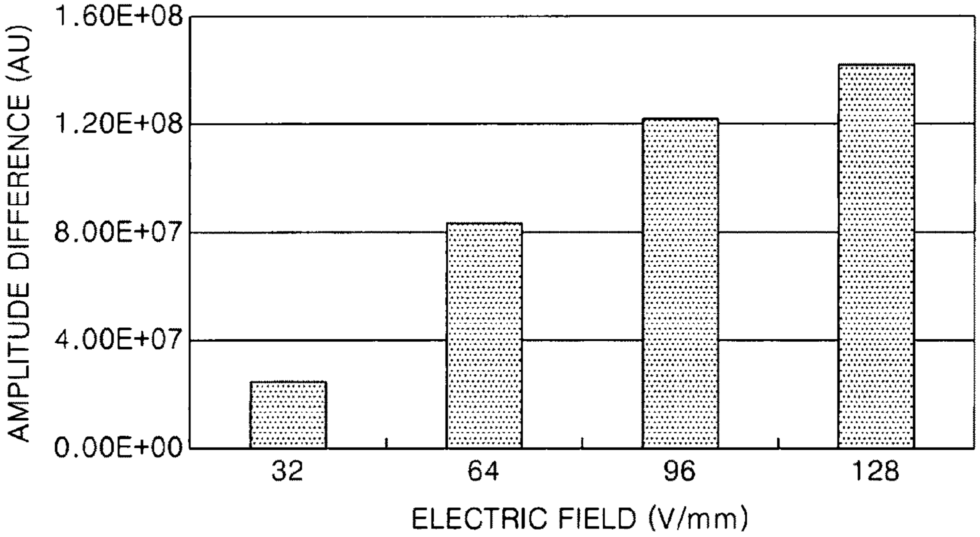
FIG. 15 is a graph illustrating bacteria separation according to voltage.

FIG. 15 is a graph illustrating bacteria separation according to voltage amplitude. As shown in FIG. 15, as the voltage increased, the efficiency of bacteria separation increased.

In the current example, the flow rate of the *E. coli* $1\times10^7$ cells/ml distilled water solution was changed to observe the effect of flow rate on bacteria separation. The voltage frequency was 300 kHz, the voltage applied was 128 V/mm and 100 μl of the *E. coli* $1\times10^7$ cells/ml distilled water solution was injected at a flow rate in the range of 50 μl/min. to 200 μl/min. The *E. coli* was dyed with SYTO-9, and after injecting the *E. coli* $1\times10^7$ cells/ml distilled water solution through each pore for 1 min., separation of the bacteria was observed using the inverted microscope.

Figure 16:
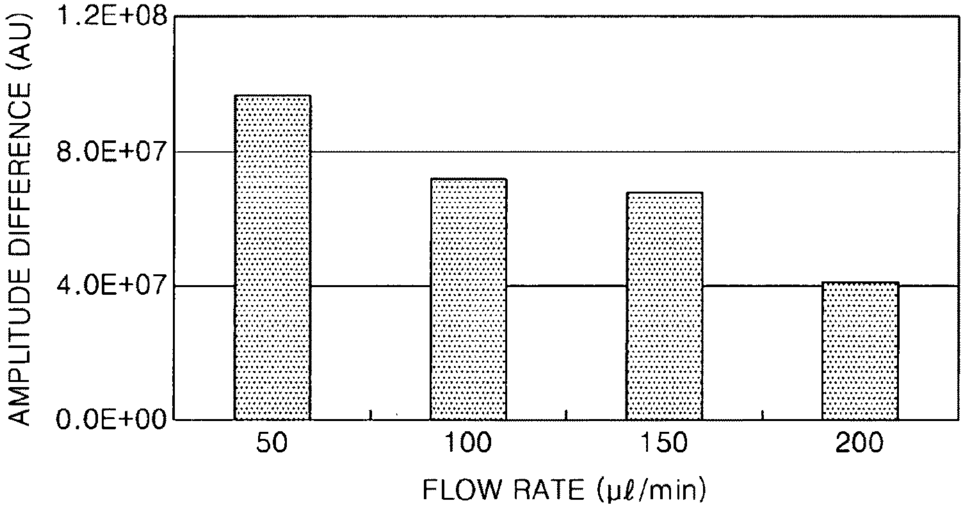
FIGS. 16 and 17 are graphs illustrating bacteria separation according to a flow rate of a bacteria solution.
Figure 17:
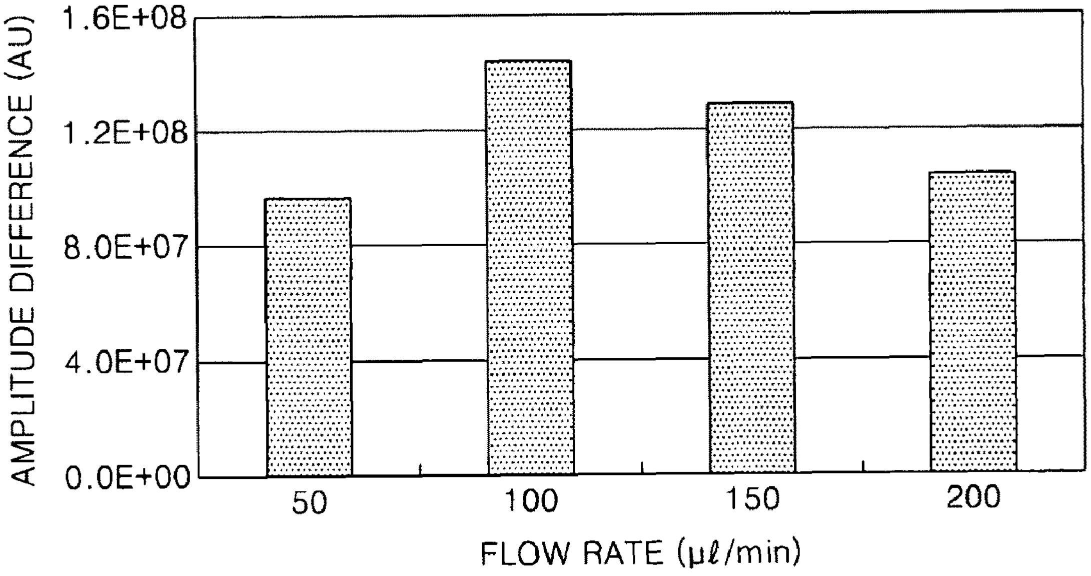

FIGS. 16 and 17 are graphs illustrating bacteria separation according to a flow rate of a bacteria solution.

In FIG. 16, 100 μl of bacteria solution was injected at various flow rates and then the amount of bacteria captured in chips was observed using a fluorescent microscope. The amount of bacteria was remarkably low when the flow rate was high. However, bacteria were captured using dielectrophoresis in the current example, even at high flow rates, unlike a conventional method disclosed in IEEE Eng. Med. Biol. Mag. 2003, 22(6), 62-67 and a conventional method disclosed in U.S. Pat. No. 7,014,747.

FIG. 17 is a graph illustrating the amount of bacteria captured for 1 min. after injecting the bacteria solution at various flow rates, and observed using a fluorescent inverted microscope. The amount of bacteria was highest when the flow rate was 100 μl/min. When the flow rate was too high, the amount of bacteria was remarkably low because the flow rate was stronger than the dielectrophoresis force.

Also in the current example, to observe bacteria separation using the apparatus of the present invention, a voltage was applied while injecting bacteria solution, and the concentration of bacteria in the eluted solution was observed using a colony counting method. As the bacteria solution, *E. coli* $1\times10^5$ cells/ml distilled water solution was used. The *E. coli* $1\times10^5$ cells/ml distilled water solution was injected at 50 μl/min., while applying 128 V/mm of electric field and 300 kHz of voltage frequency. The solution flown out of the apparatus was collected 50 μleach, diluted, and was cultivated using 3M Petrifilm for 24 hours in order to count colony numbers.

Figure 18:
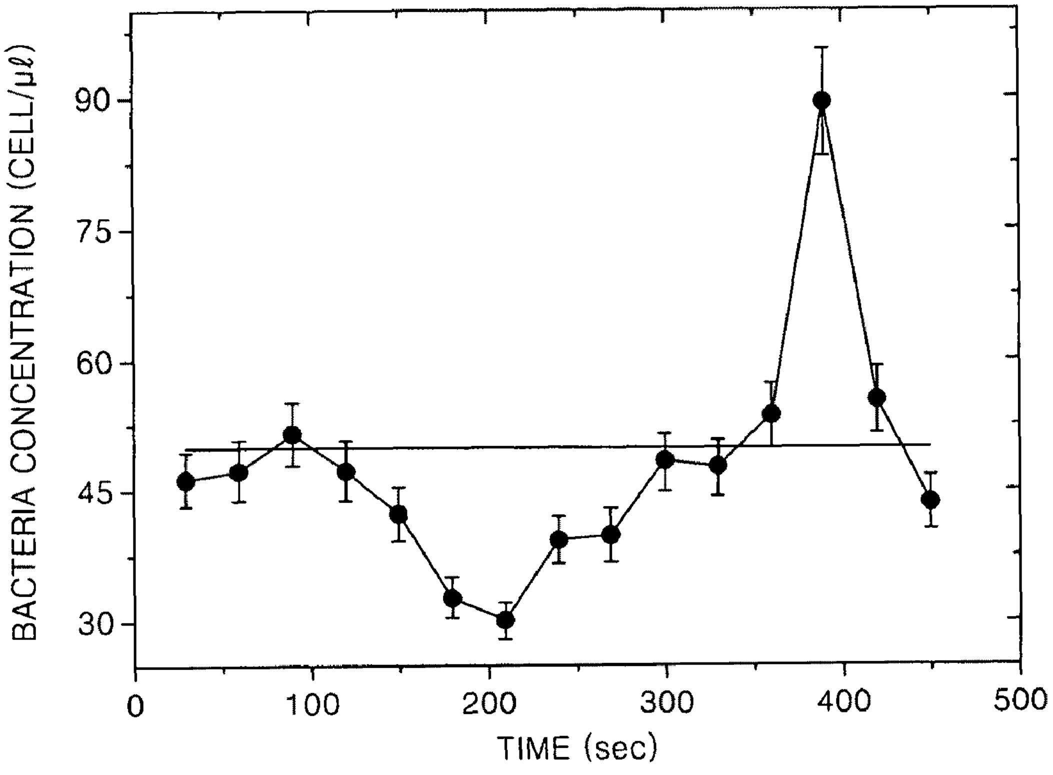
FIG. 18 is a graph illustrating bacteria concentration in a flown-out solution after separating bacteria cells using the exemplary embodiment of an apparatus according to the present invention.

FIG. 18 is a graph illustrating bacteria concentration in a flown-out solution after separating bacteria cells using the exemplary embodiment of the apparatus according to the present invention. As shown in FIG. 18, the bacteria concentration continuously decreased for about 200 sec., and then increased after about 200 sec. This shows that bacteria concentration decreases while the bacteria are being captured in the pores due to dielectrophoresis, and the bacteria elutes out of the apparatus when the capturing capability is exceeded.

By using the exemplary embodiment of the apparatus for separating polarizable analyte using dielectrophoresis according to the present invention, polarizable materials in a sample can be efficiently analyzed. Specifically, the processing efficiency is excellent because the apparatus can process the sample, even at a high flow rate.

Also, using the method of separating a target analyte in a sample according to the present invention, polarizable materials in the sample can efficiently be analyzed.

While the present invention has been particularly shown and described with reference to exemplary embodiments and examples thereof, it will be understood by those of ordinary skill in the art that various changes in form and details may be made therein without departing from the spirit and scope of the present invention as defined by the following claims.

What is claimed is:

1. A method of separating a target analyte in a sample using an apparatus for separating a polarizable analyte using dielectrophoresis, the apparatus comprising a vessel including a membrane having a plurality of nano- to micro-sized pores, the membrane disposed inside the vessel wherein the vessel is a microchannel and the membrane is disposed in a direction substantially perpendicular to a flowing direction of a fluid in the vessel, electrodes for generating spatially non-uniform electric fields in the nano- to micro-sized pores of the membrane when an AC voltage is applied to the electrodes, and a power source for applying the AC voltage to the electrodes, wherein a sectional area of the pores, formed in a surface of the membrane or in a plane parallel to the surface of the membrane, varies along a depth of the pores, the method comprising:

contacting the membrane with the sample; and dielectrophoretically separating the polarizable analyte in the sample based on the permittivity of the analyte by applying the AC voltage to the electrodes from the power source to generate spatially non-uniform electric fields in the membrane in which target analyte is either attracted to or repelled from the electric field.

2. The method of claim 1, further comprising eluting separated target analyte.

3. The method of claim 1, further comprising detecting separated target analyte.

4. The method of claim 1, wherein the target analyte is selected from a group including a cell, a virus, a nanotube, and a microbead.

* * * * *